United States Patent
Basquin et al.

(10) Patent No.: US 11,607,860 B2
(45) Date of Patent: Mar. 21, 2023

(54) COMPOSITE PART, IN PARTICULAR INTERIOR TRIM PART, AND METHOD FOR PRODUCTION THEREOF

(71) Applicant: Faurecia Innenraum Systeme GmbH, Hagenbach (DE)

(72) Inventors: Guillaume Basquin, Wissembourg (FR); Othmane Faik, La Wantzenau (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 61 days.

(21) Appl. No.: 16/388,652

(22) Filed: Apr. 18, 2019

(65) Prior Publication Data
US 2019/0322070 A1    Oct. 24, 2019

(30) Foreign Application Priority Data
Apr. 20, 2018    (DE) .................... 10 2018 206 120.3

(51) Int. Cl.
*B32B 3/12*    (2006.01)
*B32B 1/00*    (2006.01)
(Continued)

(52) U.S. Cl.
CPC ............... *B32B 1/00* (2013.01); *B32B 3/12* (2013.01); *B32B 3/266* (2013.01); *B32B 7/12* (2013.01); *B32B 17/10018* (2013.01); *B32B 27/12* (2013.01); *B60R 13/02* (2013.01); *B32B 2605/003* (2013.01); *B60K 2370/152* (2019.05)

(58) Field of Classification Search
CPC ............ B32B 3/12; B32B 17/00–1099; Y10T 428/24149–24165; Y10T 428/236; E04C 2/36; E04C 2/365; B60R 13/00; B60R 13/02–043; B29L 2031/608; B29C 66/7254
See application file for complete search history.

(56) References Cited

U.S. PATENT DOCUMENTS 4,124,277 A * 11/1978 Stang ............... B32B 17/10174
                                                    359/846
4,957,797 A *  9/1990 Maeda ...................... B32B 5/18
                                                    428/116
(Continued)

FOREIGN PATENT DOCUMENTS

| CN | 101850638 A | 10/2010 |
| CN | 106182948 A | 12/2016 |

(Continued)

OTHER PUBLICATIONS

Extended European Search Report issued in EP Application No. 18175285.8 [with Google machine translation], completed Oct. 17, 2018, 14 pages.
(Continued)

*Primary Examiner* — Z. Jim Yang
(74) *Attorney, Agent, or Firm* — Faegre Drinker Biddle & Reath LLP (57) ABSTRACT

The application relates to a composite part which comprises a cell core, a connecting layer, a planar glass and optionally a further flexible layer. The cell core is filled with a hardened polymer, such that the composite part can be produced in a one-shot process.

7 Claims, 4 Drawing Sheets

(51) Int. Cl.
  *B32B 7/12*  (2006.01)
  *B32B 27/12* (2006.01)
  *B32B 17/10* (2006.01)
  *B60R 13/02* (2006.01)
  *B32B 3/26*  (2006.01)

(56) References Cited

U.S. PATENT DOCUMENTS

| | | | | |
|---|---|---|---|---|
| 5,437,750 | A * | 8/1995 | Rinse | B29C 66/72525 |
| | | | | 156/293 |
| 6,055,029 | A * | 4/2000 | Kurihara | G02B 6/0093 |
| | | | | 362/633 |
| 8,202,616 | B2 | 6/2012 | Suzuki et al. | |
| 10,065,576 | B2 | 9/2018 | Faik et al. | |
| 10,946,600 | B1 * | 3/2021 | Hundley | B29C 73/02 |
| 2005/0003148 | A1 * | 1/2005 | Myles | B32B 15/20 |
| | | | | 428/116 |
| 2005/0249476 | A1 * | 11/2005 | Herren | G01M 11/04 |
| | | | | 385/135 |
| 2007/0102094 | A1 * | 5/2007 | de Groot | B29C 66/721 |
| | | | | 264/445 |
| 2007/0122588 | A1 * | 5/2007 | Milburn | E06B 3/6715 |
| | | | | 428/428 |
| 2007/0221313 | A1 | 9/2007 | Franck et al. | |
| 2007/0291384 | A1 * | 12/2007 | Wang | B32B 17/1022 |
| | | | | 359/883 |
| 2008/0135687 | A1 * | 6/2008 | Penzo | F42B 15/10 |
| | | | | 244/173.1 |
| 2008/0182067 | A1 * | 7/2008 | Shen | B32B 37/146 |
| | | | | 521/50 |
| 2009/0201436 | A1 | 8/2009 | Strazzanti | |
| 2009/0268278 | A1 | 10/2009 | Suzuki et al. | |
| 2010/0144980 | A1 | 6/2010 | Fujibayshi et al. | |
| 2010/0321870 | A1 * | 12/2010 | Hirai | G06F 1/1656 |
| | | | | 361/679.01 |
| 2011/0287230 | A1 | 11/2011 | Akuzawa et al. | |
| 2012/0031010 | A1 * | 2/2012 | LaConte | B64D 11/003 |
| | | | | 49/503 |
| 2013/0078417 | A1 * | 3/2013 | Schmidt | C08J 5/249 |
| | | | | 428/116 |
| 2014/0050886 | A1 | 2/2014 | Burgin et al. | |
| 2014/0113105 | A1 * | 4/2014 | Yasukochi | B32B 3/12 |
| | | | | 428/116 |
| 2014/0283472 | A1 * | 9/2014 | Moore | E04C 2/26 |
| | | | | 264/273 |
| 2015/0008281 | A1 * | 1/2015 | Perazzolo | B32B 9/025 |
| | | | | 244/1 N |
| 2015/0291085 | A1 | 10/2015 | Manning | |
| 2015/0321434 | A1 | 11/2015 | Sterman et al. | |
| 2016/0054762 | A1 * | 2/2016 | Garelli | G06F 1/1656 |
| | | | | 361/679.55 |
| 2016/0229991 | A1 | 8/2016 | Diez Diaz et al. | |
| 2016/0272538 | A1 * | 9/2016 | Friedman | B32B 21/02 |
| 2016/0279920 | A1 * | 9/2016 | Burkhard | B32B 3/12 |
| 2016/0280128 | A1 | 9/2016 | Cannon | |
| 2016/0375843 | A1 | 12/2016 | Faik et al. | |
| 2017/0348951 | A1 | 12/2017 | Curfman et al. | |
| 2018/0050948 | A1 | 2/2018 | Faik et al. | |
| 2018/0065881 | A1 * | 3/2018 | Hashimoto | C03C 3/087 |
| 2018/0111569 | A1 | 4/2018 | Faik et al. | |
| 2018/0169993 | A1 * | 6/2018 | Carstensen | B29D 24/005 |
| 2018/0230905 | A1 * | 8/2018 | Riou | B32B 7/12 |
| 2018/0312278 | A1 * | 11/2018 | Baca | B32B 3/12 |
| 2018/0345879 | A1 | 12/2018 | Chapeau et al. | |
| 2019/0213990 | A1 * | 7/2019 | Jonza | B32B 3/12 |
| 2019/0224939 | A1 * | 7/2019 | Kooiman | B32B 15/08 |
| 2020/0070465 | A1 * | 3/2020 | Hundley | B32B 3/266 |
| 2020/0133067 | A1 * | 4/2020 | Chiang | G02F 1/133603 |

FOREIGN PATENT DOCUMENTS

| | | | | |
|---|---|---|---|---|
| DE | 19928235 | A1 | 4/2000 | |
| DE | 202006002835 | U1 | 9/2006 | |
| DE | 102013214108 | A1 | 2/2015 | |
| DE | 102014107098 | A1 | 11/2015 | |
| DE | 102014011230 | A1 | 1/2016 | |
| DE | 102015105694 | A | 10/2016 | |
| EP | 1305189 | B1 | 5/2003 | |
| KR | 20140141292 | A * | 12/2014 | B60R 13/011 |
| WO | 02057374 | A1 | 7/2002 | |
| WO | 2015188017 | A1 | 12/2015 | |
| WO | 2016024029 | A1 | 2/2016 | |

OTHER PUBLICATIONS

German Search Report issued in DE Application No. 10 2017 209457.5 [with Google machine translation], dated Apr. 19, 2018, 20 pages.

* cited by examiner

COMPOSITE PART, IN PARTICULAR INTERIOR TRIM PART, AND METHOD FOR PRODUCTION THEREOF

CROSS-REFERENCE TO RELATED APPLICATION

This application claims priority to German Application No. DE 10 2018 206 120.3, filed Apr. 20, 2018, which is herein incorporated by reference in its entirety.

TECHNICAL FIELD

The present application relates to a composite part and to a suitable method for producing that composite part.

BACKGROUND

Composite parts, in particular interior trim parts (for example centre consoles, dashboards, door trims or the decorative surfaces of the aforementioned parts), are used in the vehicle sector, but also in other sectors, such as decorative surfaces in the home sector. Various materials and various layered structures are possible for the composite parts. In some composite parts a planar glass forms the A side, i.e. the side that can be touched and/or can be seen by the user. A planar glass (or also glass face) is understood here for example also to mean a glass element in the form of a glass plate. Often, the glass face is mounted on a support, which in turn may have a layered structure. Glass is often used here on account of its particularly aesthetic effect and feel. A composite part of this kind is used for example in vehicle interiors in order to cover parts of the centre console or the dashboard. In a large number of the aforementioned composite parts it is necessary that this composite part has the ability to bend. Often, the glass is applied to a finished support and is then bent jointly therewith in a bending tool. Generally, in particular cell cores, for example made of aluminium, are potential supports. For example, US 2005 003 148 presents a composite part with an A-side glass face which is applied to an aluminium honeycomb core. The fastening to aluminium cores is often selected because the aluminium core has a high stability and thus can support the glass. The subsequent bending of a composite part of this kind, however, is almost impossible or is very complex.

SUMMARY

The object of the present disclosure is to achieve an improvement for composite parts of this kind.

The composite part comprises a cell core including a plurality of cells extending between a first surface and an opposing second surface. In particular, the walls of the cells extend from the first surface to the second surface, such that the cavities defined by the cells run between the first and second surface and therefore bring about a continuous connection between the first surface and the second surface of the cell core. A planar glass is arranged on the second surface of the cell core.

The cell core is filled with a hardened or solidified polymer, for example a resin, in particular a formaldehyde resin or a reaction resin. The reaction resin is preferably an epoxy, however other resins may also be used, for example methacrylate. The aforementioned resins are preferred in some embodiments since they are less viscous than molten thermoplastic polymers and therefore can fill the cell core well. The cell core is filled with a hardened or solidified polymer in such a way that this polymer protrudes through a plurality of cells and bonds the cell core to the first side of the glass. Although until now only resins have been discussed, the cell core may also be filled with thermoplastics. When filling the cell core, all cells or only some of the cells may be filled. Furthermore, the individual filled cells can be filled completely or also only in part. The polymer filling the cell core produces a connection to the glass and fixes the form of the composite part, for example a curved form.

The connection between glass and cell core can be direct, wherein the polymer is directly bonded to the glass. Alternatively to a direct connection, the glass and the cell core can be connected to one another indirectly, wherein there is a layer, for example an adhesive layer, between the polymer and the glass. In embodiments with an indirect connection, the composite part may comprise a connecting layer, which is on one side bonded to the glass and on the other side is connected to the cell core filled with polymer. The connecting layer may be a film, for example a transparent film. The connecting layer may be coated with an adhesive on one side, for example on the side of the glass, or on both sides.

The planar glass (or also glass face) is typically understood here for example to mean a glass element in the form of a glass plate. The planar glass can be, but is not limited to, sheet glass, flat glass or plate glass.

The planar glass may comprise a decorative layer, which prevents or limits the view through the glass, at least in some regions. The decorative layer may be impermeable to light, translucent, or coloured and see-through. The decorative layer may be arranged on the visible side of the glass, that is to say on the side of the glass facing away from the cell core, or on the other side of the glass. The decorative layer may also be enclosed within the planar glass. The decorative layer may be etched into the glass, example by means of a laser or by sandblasting. The decorative layer, however, may also comprise a lacquer or a paint.

The polymer can be introduced into the cell core within the scope of a transfer moulding process (resin transfer moulding). In this way, it is possible on the one hand to strengthen the cell core by means of the polymer and on the other hand to bend the composite formed of glass and cell core (and optionally a connecting layer) just before the polymer or material that is to be polymerised is introduced into the cell core, or during this process. If this composite is bent and the cell core is filled with the polymer subsequently or during the bending process and the polymer is then hardened or solidified, the support function of the cell core can be produced simultaneously to the shaping or bending of the glass. In this way it is possible to produce a bent composite part as described herein in a single process step or in a single tool. The production time is hereby shortened, whereby the production costs are in turn lowered, and furthermore the process reliability is increased, since the composite part is strengthened only by the transfer moulding. Because the polymer or the polymerisable material only hardens or solidifies once it has been bent, the polymer holds the composite part in the bent form. The bent form here is understood to mean a form of the composite part which extends in a YZ plane and is bent by changing of the form of the composite part in the X direction. It may be clear that, in general, the bent form is not maintained without external force, like for example the hardened or solidified polymer. The bend radius of the bent form may be for example between 50 and 1000 mm, preferably between 200 and 400 mm.

Numerous different cell core materials can be used for the composite part proposed here and production method for same. For example, in some embodiments it is provided that the cell core comprises a cellulose-containing and/or recycled material. For example, the cell core can consist of paper or paperboard. On account of the cell structure the cell core has sufficient stability to not be crushed when the composite formed of cell core and glass is bent, and furthermore the bent form is fixed permanently on account of the hardening or solidification of the polymer. This effect contributes to the fact that also non-metal or synthetic polymers or renewable raw materials can be considered as materials for the cell core. Of course, the composite part may however also comprise metal cell cores.

Besides paper and paperboard, the cell core may for example also be constructed from a plastic, such as a thermoplastic, with honeycomb structure. Other fibrous materials, such as cell cores formed from natural fibres, are also usable. For example, wood, flax, kenaf, sisal, hemp or similar fibrous materials can be used as natural fibres. The walls of the cells are preferably thin in comparison to the thickness of the glass and are produced from a material that can bend easily, and therefore the cell core can bend in a direction perpendicular to the lateral extent of the cell core. The walls of the cells are preferably permeable to the polymer or the material that is to be polymerised.

With the aid of the transfer moulding process, even complex contours of the composite part can be bent and also fixed during the production of said composite part. For example, the composite part can be used as an interior or exterior trim on a centre console, a vehicle interior panel, or door trim.

Alternatively or additionally the cell core may comprise one or a plurality of opening/s in the cell wall. The one or the plurality of the opening/s in the cell wall may promote a distribution of the polymer or the material that is to be polymerised. The size of the opening/s in the cell wall depend/s on the viscosity of the polymer or the material that is to be polymerised and may be constituted for example by an area smaller than an area of a half of the cell wall, preferably smaller than an area of a quarter of the cell wall.

Alternatively or additionally the connecting layer may comprise an adhesive on the first and/or second side in order to firstly connect the cell core to the connecting layer, before the laminated cell core is placed in the transfer moulding and shaping tool. Alternatively, the first surface and/or the glass face, which is connected to the connecting layer, are/is also provided with an adhesive, for example a transparent adhesive. For example, acrylates or silicones are potential adhesives here.

Alternatively or additionally to the aforementioned embodiments the cell core may comprise one or more through-openings between the first and second surface, wherein the through-opening has an area of more than one cell (considered in the plane of the first or second surface). In other words, the cell core may have large-area cutouts, such that the finished composite part, at least in some sections, has regions in which the planar glass has no cell core behind it. This may be the case for example if, in a motor vehicle, instruments behind the glass face should be visible and/or operable. In particular with use of the composite part in vehicles, the glass layer may also be a touch-sensitive glass layer in the sense that electronic line structures are arranged in the glass face. In this way it is possible, where appropriate, to operate electronic devices arranged therebehind. For example, the size of a through-opening may be constituted for example by an area measuring between 1 cm$^2$ and 1000 cm$^2$, in particular an area measuring between 10 cm$^2$ and 500 cm$^2$. Larger and smaller areas are also possible. The laminated cell core may comprise a plurality of through-openings of this kind, if a plurality of elements visible or showing through the glass face are to be provided. In the case that the elements show through, a translucent connecting layer and/or a dark or coloured glass can be used, for example.

In further embodiments a further layer may be arranged on the second surface of the cell core, alternatively or additionally to the previous embodiments. This further layer for example is a flexible layer, which in some embodiments has a high Young's modulus of elasticity. A flexible layer is understood here to mean a layer which can be bent together with the further components of the composite part in a pressing tool or shaping tool or the integrated pressing and shaping tool. For example, the further layer may be a textile, in particular a carbon textile, i.e. a fabric formed from carbon fibres. The further layer is preferably permeable to light and liquids, such as the polymerisable material with which the cell core is filled. If all layers on the visible side of the further layer are see-through, a viewing channel from the A side of the glass, through the cells, to the further layer is created, such that the carbon textile is visible through the glass. If the layers are not see-through, but are permeable to light, for example additional optical effects can be produced through the flexible layer. In addition, the further layer is suitable for application to a solid support, for example a centre console or a dashboard. The further layer in particular is a layer through which the polymer or the polymerisable material can infiltrate within the scope of a transfer moulding process. It is therefore advantageous for example to use woven fabric, warp-knitted fabric or weft-knitted fabric, the openings of which the polymer, in its liquid state, can penetrate. The openings in the woven fabric, warp-knitted fabric or weft-knitted fabric in some exemplary embodiments are smaller than the area of a cell of the cell core considered in the plane of the first surface.

In the sense of this application the material glass may be understood on the one hand to mean genuine glass and on the other hand bendable plastic glasses. Aluminosilicate glass is preferred for the use in a vehicle, amongst other things due to its resilience.

In further embodiments the glass comprises on one side a glass layer and on the other side a decorative layer arranged between the connecting layer and the glass layer, which decorative layer is directly connected to the connecting layer. In this way, optical effects of the composite part can also be provided. In some embodiments the used glass is for example aluminosilicate glass. However, other suitable glasses which can be shaped during the filling of the cell core are also usable for the composite part.

As already mentioned at the outset, a composite part described here can be used in a vehicle, in particular in the interior of a vehicle. When producing a composite part of this kind the first surface of the cell core is connected to the further layer to form a laminated cell core. The second surface of the cell core is optionally covered by a connecting layer, in particular by an adhesive layer. The laminated cell core is then placed with the planar glass into the transfer moulding and shaping tool, and the laminated cell core and the planar glass are bent together in accordance with the requirements of the end user of the composite part. At the same time, within the scope of a transfer moulding process, the liquid material is introduced into the cell core and is then solidified or hardened, such that the form predefined in the tool is retained by the composite part also once the tool has been opened.

Before the laminated cell core is placed together with the planar glass in the transfer moulding and shaping tool, one or more through-openings can be formed in the cell core laminated with the further layer and optionally with the connecting layer. The one or more through-openings comprises/comprise an area of a plurality of cells of the cell core, so that the openings as considered from the visible side of the composite part are larger than a cell. Although until now only a cell composite of cell core, connecting layer and planar glass has been described, the cell core in further embodiments can be directly contacted with the planar glass and bonded thereto by means of the hardened polymer. Here, the cell core is applied to the glass and the polymer is then applied directly to this.

For example, the pressing and shaping tool can be designed such that it comprises additional projections or areas in order to cover through-openings in the laminated cell core, such that the polymer in the liquid state is not in contact with the regions of the glass accessible directly through the through-openings.

The thickness of the glass layer perpendicular to the planar form may be for example between 0.3 and 1.5 mm, preferably between 0.5 and 1.0 mm. The cell core is preferably thicker than the glass layer and for example may have a thickness perpendicular to the planar form of from 3 to 25 mm, preferably between 5 mm and 15 mm. The thickness of the further layer perpendicular to the planar form may be for example between 0.2 and 2.0 mm. The thickness of the connecting layer perpendicular to the planar form may be for example between 0.1 and 0.3 mm. The composite part may have overall a thickness of from 4 mm to 30 mm, for example a thickness between 5 mm and 15 mm.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The disclosure will be explained in greater detail hereinafter with reference to a number of exemplary embodiments. In the drawings.

Various composite parts, in particular interior trim parts, such as surfaces for centre consoles, door trims or dashboards, will be presented with reference to the figures.

DETAILED DESCRIPTION

Figure 1:
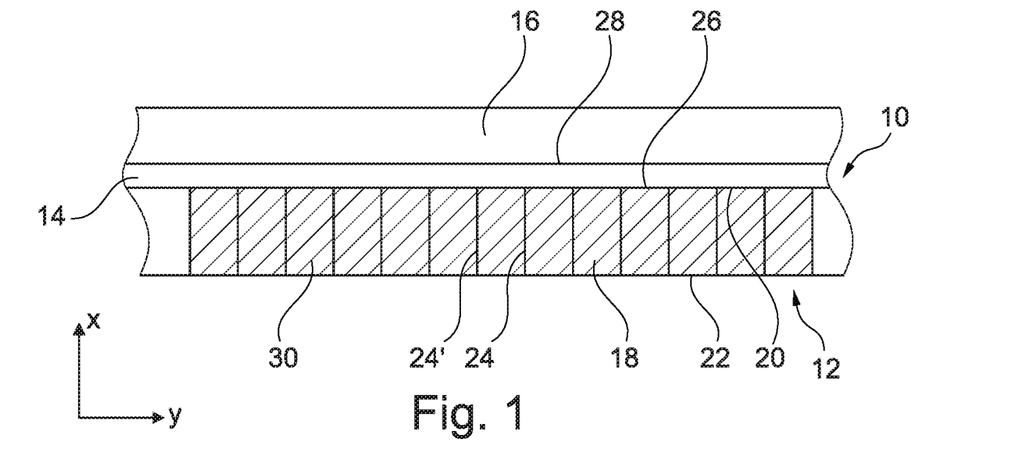
FIG. 1 shows an exemplary embodiment of a composite part in cross-section.

FIG. 1 shows in cross-section a composite part 10 which has a cell core 12, a connecting layer 14 and a planar glass layer 16. The connecting layer 14, besides an adhesive function, may also have a decorative function. For example, the connecting layer may be coloured and/or may have a pattern. The cell core 12 has a plurality of cells 18, which extend between a first surface 20 and a second surface 22 in the X direction. The cells 18, which in the X direction are open or at least permeable to the liquid material, are separated from one another by partition walls 24 and 24'. The cells may have a square, rectangular, diamond-shaped or preferably honeycomb-shaped form (considered in the plan view of the Y-Z plane). In the present exemplary embodiments the cell core 12 is a cell core consisting of paperboard. This means that the walls 24 consist of paperboard or alternatively comprise a paperboard-fibre mixture and delimit the cells from one another. The cell core 12 has a thickness in the X direction of 2 mm. The connecting layer 14 is arranged on the first surface of the cell core 12.

The connecting layer 14 is for example a plastic film. Although the plastic film can be manufactured from a transparent material, a non-transparent film is preferred. The plastic film may be light-permeable in order to achieve special optical effects. Generally, however, the plastic film is impermeable to light and has a colour, for example a coloured pattern. The connecting layer may be connected on its first side 26 to the first surface 20. The connecting layer 14 may comprise an adhesive, for example an acrylate, on the first side 26, which adhesive produces an firmly bonded connection to the first surface 20, i.e. in particular to the walls 24 of the cells 18. The composite formed of the cell cores 12 and the connecting layer 14 is referred to hereinafter as a laminated cell core. The planar glass layer 16 is arranged on the second side 28 of the connecting layer 14. An adhesive is preferably provided between the planar glass layer 16 and the connecting layer 14. In other embodiments the connecting layer is an adhesive layer. In embodiments a decorative layer may be arranged additionally in the glass.

The glass layer 16 is a pretensioned glass which is connected to the laminated cell core by means of an adhesive layer arranged on the first side 28. The laminated cell core provided with the glass layer 16 may be pretensioned or bent in a pressing and/or shaping tool, such that the glass face has a curvature or contours. In order to permanently impress the form predefined in the shaping tool onto the composite part, a liquid polymer, in particular a liquid resin, is introduced into the tool, such that the resin flows into the cells 18 and produces an firmly bonded connection between the cell core 12 and the connecting layer 14 or the glass (additionally to the adhesive layer on the first side 26). Following the hardening or solidification of the resin, the bent form of the glass-comprising composite part is fixed. The hardened resin 30 then closes the cells at least in part. On account of the introduced, hardened resin 30, it is possible to produce the composite part 10 (with or without bent or contoured portion) in a pressing and moulding tool within the scope of a one-shot process.

Figure 2:
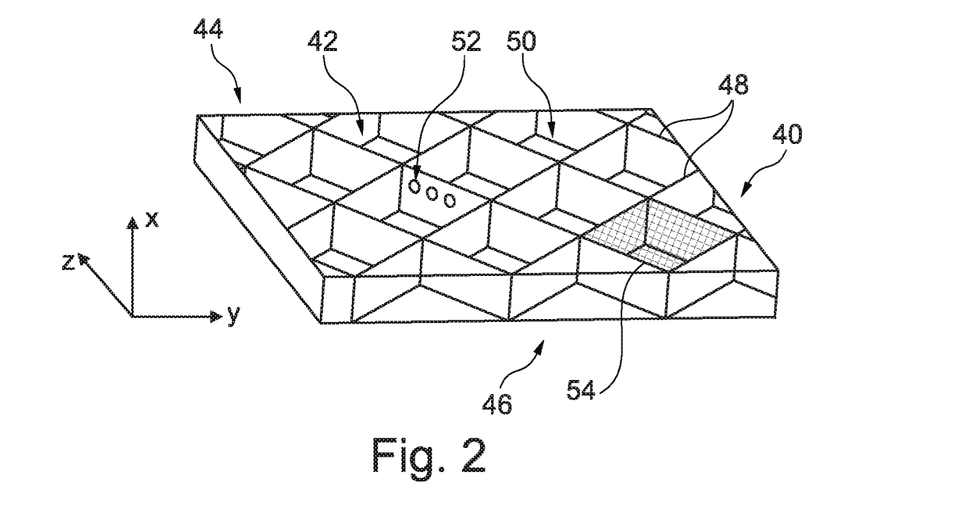
FIG. 2 shows an exemplary embodiment of a cell core with diamond-shaped cells.

FIG. 2 shows a cell core in an oblique plan view. The cell core 40 has a plurality of diamond-shaped cells 42, which extend between the first surface 44 and the second surface 46. The partition walls 48 run relative to one another in such a way that the diamonds are formed. Besides the upper openings 50 of the cells 42 and the lower openings (not shown) of the cells 42, further openings 52 can be formed in the walls 48 in the cell core. The further openings 50 promote a distribution of the liquid resin. The additional openings 52 have a smaller area size than the area size of the opening 50 in the cells 42. Although in the shown exemplary embodiments the cells 42 are all diamond-shaped, different cell forms can also be provided within a single cell core. The cell core shown here is produced from cardboard, paper, or a synthetic material.

As shown in FIG. 1, the polymer 54 fills out the cells and in its hardened state strengthens the composite part. Since a contoured form of the composite part is also fixed by the hardening of the polymer, a bent or surface-contoured composite part can be produced in a single production step in a particularly simple way, as already mentioned.

Figure 3A:
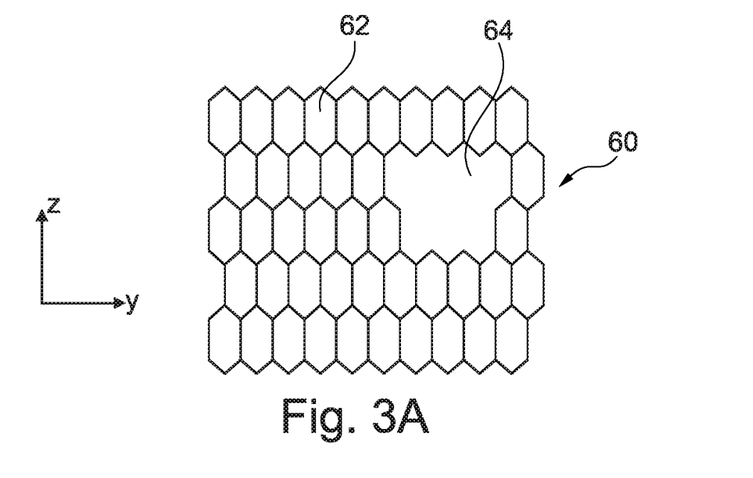
FIG. 3a shows an exemplary embodiment of a cell core with diamond-shaped cells.
Figure 3B:
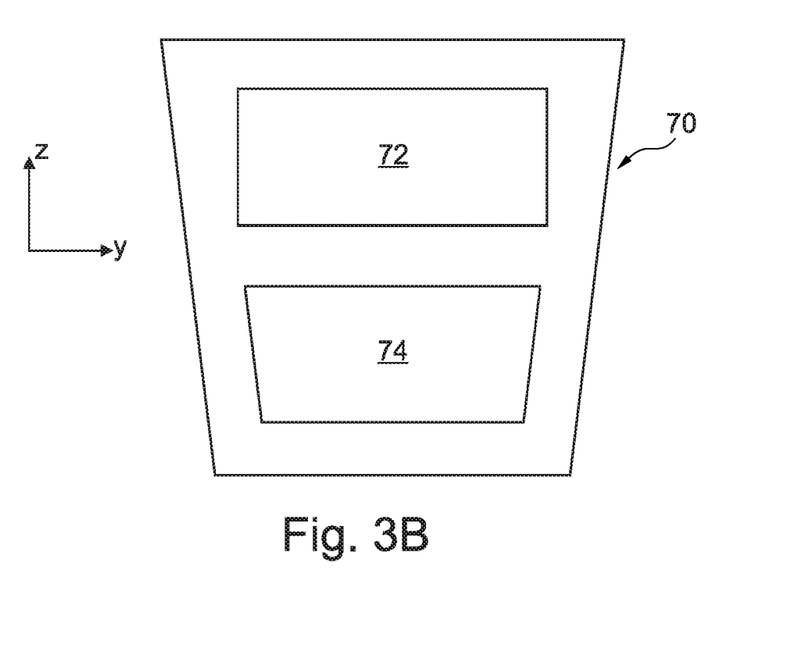
FIG. 3b shows a plan view of a laminated cell core with through-openings.

Further exemplary embodiments of cell cores or laminated cell cores are shown with reference to FIGS. 3a and 3b. FIG. 3a shows an alternative cell core 60 in a plan view of the Y-Z plane. The cell core 60 comprises a plurality of cells 62, which are honeycomb-shaped. The cells typically have an average cross-sectional size between 2 mm and 20 mm, for example an average cross-sectional size of 5 mm, in the direction parallel to the glass. Furthermore, the cell core 60 has a through-opening 64, which in terms of its area is larger than an area of more than one cell. This continuous through-opening 64, in the finished composite part, may have an electronic display arranged on the B side of the composite part, such that said display is visible behind the glass layer 16, for example. The size of the through-opening may vary. Whereas in the present example of FIG. 3a a relatively small through-opening 64 has been selected, which has an area of just 7 cells, the through-opening may also be selected in such a way that it has an area size of more than 5, 10 or 20 cm, such that for example an electronic display can be arranged so as to be visible behind the through-opening.

A laminated cell core is shown in FIG. 3b, in which the laminated cell core 70 is shown, which has through-openings 72 and 74. The laminated cell core 70 for example may be used to cover a control panel protruding from the centre console in the direction of the dashboard. The size in the XY plane shown here is approximately 60 cm in the Z direction and 20 to 30 cm in the Y direction. The through-openings have a size of approximately 20 cm in the Y direction and 5 cm in the Z direction in the case of the through-opening 72, and 10×10 cm in the case of the through-opening 74. The through-openings later, in the finished composite part, have merely the planar glass layer arranged thereabove.

Figure 4:
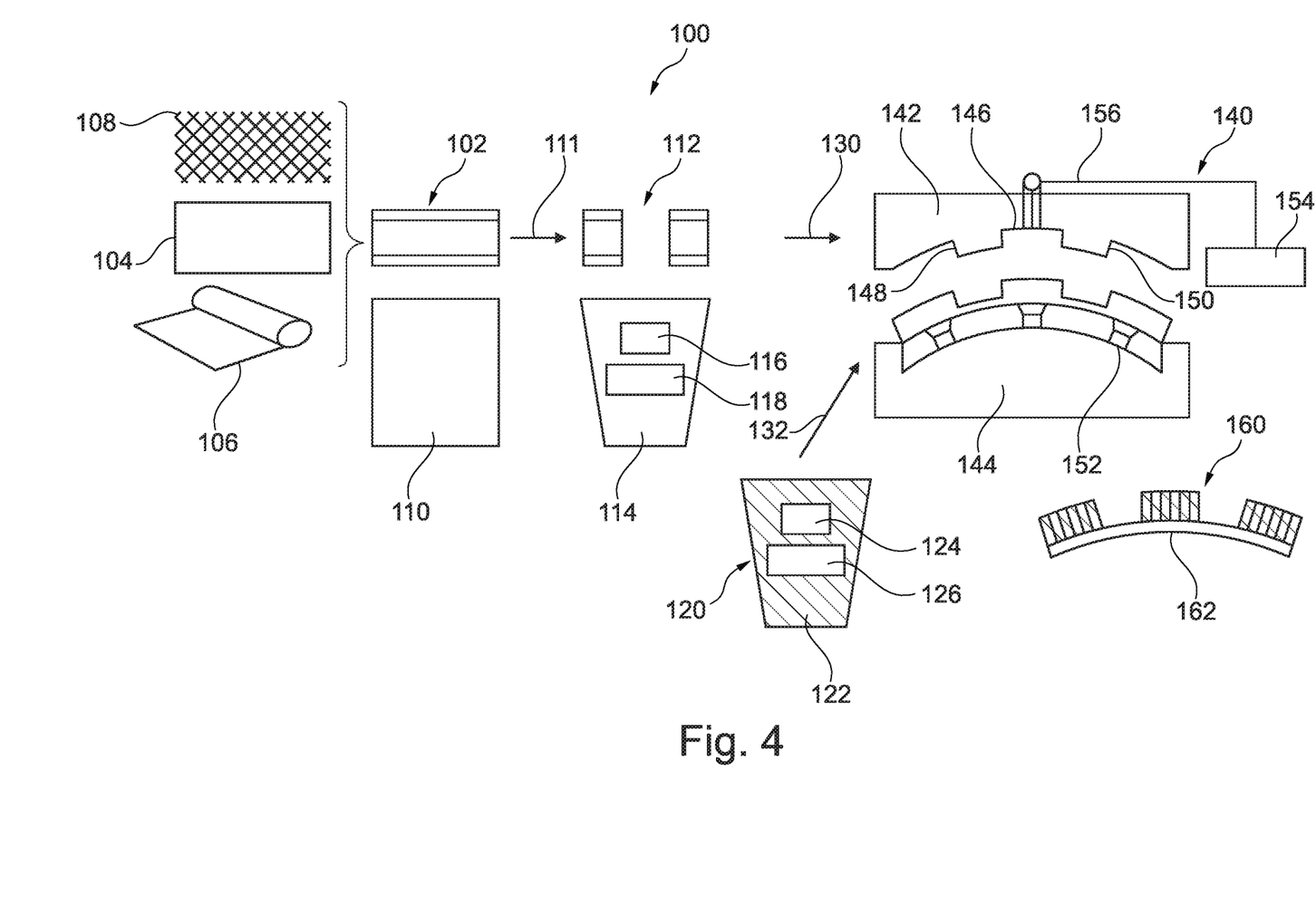
FIG. 4 shows an exemplary embodiment of a method on the basis of a flow diagram.

The production process of a composite part of this kind will be explained in greater detail with reference to FIG. 4. The composite part to be produced within the scope of the method 100 firstly has a laminated cell core, wherein the laminated cell core 102 has a cell core 104, a connecting layer 106, and a flexible layer 108 arranged on the second surface, i.e. the B side of the cell core. For example, the cell core 104 may be a cell core with honeycomb-shaped cells formed from a cellulose-containing material. The connecting layer 106 is an adhesive film. The further, flexible layer 108 is a carbon textile which has been woven from carbon fibres. These three components 106, 104 and 108 are connected to one another in the shown order or in another order, for example by means of adhesives, such that the cell core 104 is arranged between the connecting layer 106 and the flexible layer 108. In this way, the laminated cell core 102 shown in cross-section is formed and can also be seen in the plan view 110. It is clearly visible that the connecting layer and the cell core free the view to the composite textile arranged on the B side if the connecting layer is see-through. In this way, the carbon aesthetics presented here are visible from the A side in the finished composite part.

In a subsequent method step 111 the laminated cell core 102 is provided with through-openings, such that the laminated cell core 112 provided with through-openings is provided. The laminated cell core 112 provided with through-openings and shown in cross-section is also shown in its plan view 114. The through-openings 116 and 118 are clearly visible in the plan view 114.

Besides the laminated cell core 112, a glass layer 120 to be arranged on the laminated cell core 112 is provided. This has external dimensions comparable to the laminated cell core 112 provided with through-openings. The glass layer 120 is a glass layer formed from aluminosilicate glass. This is provided on its B side with a coloured pigmentation 122, which, outside the free areas 124 and 126 corresponding to the through-openings, colours the glass so as to make it dark or give it a desired colour.

Once the laminated cell core 112, provided with through-openings, and the glass layer 120 have been provided, these are introduced in a further method step 130 or 132 into the pressing and shaping tool 140. The pressing and shaping tool for example comprises a first shaping half 142 and a second shaping half 144, wherein the first shaping half 142 comprises a shaping face 146 with projections 148 and 150. The projections 148 and 150 are formed such that they engage in the through-openings 116 and 118 and thus prevent liquid polymer from coming directly into contact with the glass in the region of the through-openings. The second shaping half 144 has receiving devices 152, on which the glass surface 120 can be arranged.

The laminated cell core 112 is arranged on the glass face 120. The pressing and shaping tool is then closed. In so doing, the laminated cell core 112 and the glass face 120 are preliminarily bent cold in the contour defined by the tool. As soon as the tool is closed, a liquid resin is released from the resin reservoir 154 from the B side and flows via lines 156 into the interior of the tool and fills substantially all cells of the laminated cell core through the further layer, such that an firmly bonded connection is produced between the cell core and the connecting layer. As a result of the subsequent hardening, the composite part is fixed in the contour defined by the shaping tool. The hardening can be carried out here for example by heating, such that the resin is heated above a reaction or cross-linking temperature. Alternatively, the hardening can be carried out by means of a reaction resin which hardens after a certain reaction time. The finished composite part 160, which has a contour on the A side 162, is then removed from the tool. This composite part 160 can then be mounted directly on the centre console.

Figure 5:
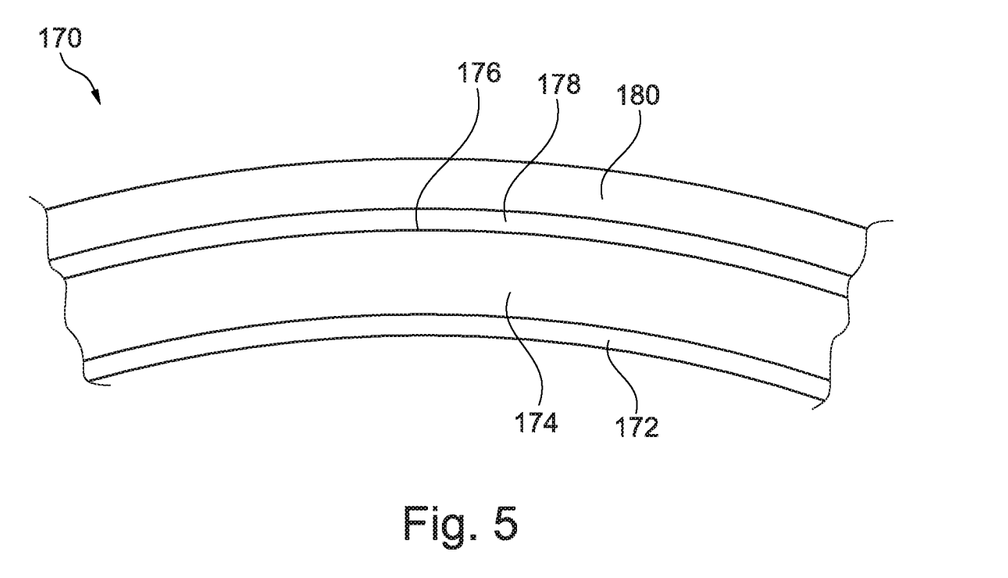
FIG. 5 shows a further exemplary embodiment of a composite part.

The layered structure of a composite part 170 comparable to the composite part 160 will now be discussed briefly with reference to FIG. 5. The composite part 170 has a B-side further flexible layer 172, which for example may consist of a carbon textile, a carbon weft-knitted fabric or a carbon warp-knitted fabric. This fabric has machine openings which allow the liquid resin to infiltrate the cell core 174. The connecting layer 178 is arranged on the second surface 176 of the cell core, and the glass layer 180 is arranged in turn on said connecting layer. Although a connecting layer 178 is provided in all of the present exemplary embodiments, the glass layer 180 in some exemplary embodiments can be provided optionally with an adhesive, and the cell core 176 can be brought into direct connection with the glass layer. The initially liquid, then hardening polymer then leads to an firmly bonded connection between the cell core 176 and the glass layer 180.

Further exemplary embodiments will be obvious to a person skilled in the art and are not described exhaustively by the exemplary embodiments presented in this application.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

The following is claimed:

1. A composite part comprising:
a cell core including a plurality of cells extending between a first surface and an opposing second surface;
a planar glass having a first side facing the second surface and an opposing second side;
wherein the cell core is filled with a hardened or a solidified polymer, such that the polymer protrudes through the plurality of cells and bonds the cell core indirectly or directly to the first side of the planar glass;
wherein a further layer is arranged on the first surface of the cell core and is bonded to the polymer,
wherein the further layer is a fabric and is permeable for the polymer in a liquid state before hardening or solidifying, and
wherein the cell core has one or more through-openings between the first and second surface, such that the composite part has one or more regions where the planar glass has no cell core behind it and the polymer is absent, wherein the through-opening has an area of more than one cell and measuring between 10 $cm^2$ and 1000 $cm^2$.

2. The composite part according to claim 1, further comprising a connecting layer, which is arranged between the cell core and the planar glass and which is bonded to the first side of the planar glass.

3. The composite part according to claim 1, wherein the planar glass comprises a decorative layer.

4. The composite part according to claim 1, wherein the composite part has a portion in which the planar glass is bent and held by the solidified or hardened polymer in the bent form.

5. The composite part according to claim 1, wherein the connecting layer comprises an adhesive on one or more of the first and the second side of the connecting layer.

6. The composite part according to claim 1, wherein the further layer comprises fibres having a high modulus of elasticity.

7. The composite part according to claim 1, wherein the polymer is a resin.

* * * * *